US011053884B2

(12) United States Patent
Coutts

(10) Patent No.: US 11,053,884 B2
(45) Date of Patent: Jul. 6, 2021

(54) INTERNAL COMBUSTION ENGINE

(71) Applicant: Coutts Industries Inc., Erinsville (CA)

(72) Inventor: Clyde Coutts, Erinsville (CA)

(73) Assignee: Coutts Industries Inc., Erinsville (CA)

( * ) Notice: Subject to any disclaimer, the term of this patent is extended or adjusted under 35 U.S.C. 154(b) by 0 days.

(21) Appl. No.: 17/031,226

(22) Filed: Sep. 24, 2020

(65) Prior Publication Data
US 2021/0087996 A1 Mar. 25, 2021

(30) Foreign Application Priority Data

Sep. 24, 2019 (CA) .................................. CA 3056503

(51) Int. Cl.
F02F 3/20 (2006.01)
F02F 1/42 (2006.01)
(Continued)

(52) U.S. Cl.
CPC .............. F02F 3/20 (2013.01); F02B 33/06 (2013.01); F02B 33/30 (2013.01); F02B 75/02 (2013.01);
(Continued)

(58) Field of Classification Search
CPC .... F02F 3/20; F02F 1/4285; F02F 3/28; F02F 3/285; F02M 35/10216; F02M 35/104;
(Continued)

(56) References Cited

U.S. PATENT DOCUMENTS 1,029,929 A * 6/1912 Hellmann ............... F02B 41/04
123/47 AB
1,082,402 A * 12/1913 Campbell ............... F02B 75/22
123/152
(Continued)

FOREIGN PATENT DOCUMENTS

CN 200940553 Y 8/2007
CN 101173628 A 5/2008
(Continued)

Primary Examiner — Grant Moubry
(74) Attorney, Agent, or Firm — Stephen J. Scribner

(57) ABSTRACT

An internal combustion engine includes a hollow cylinder, a piston within the hollow cylinder, and a cylinder head. A base valve assembly at a base of the hollow cylinder permits or restricts fluid flow from an intake manifold into a sub-chamber below the piston. The piston includes at least one intake port connecting a combustion chamber above the piston with the sub-chamber, and a transfer valve that opens and closes the at least one intake port. When the transfer valve opens the at least one intake port, fluid is permitted to flow from the sub-chamber to the combustion chamber. The internal combustion engine operates according to a four-stroke piston cycle, wherein multiple intake stages are provided. The intake stages may include intake of air into the sub-chamber during a compression stroke, transfer of air from the sub-chamber to the combustion chamber during a power stroke, intake of air-fuel mixture into the sub-chamber during an exhaust stroke, and transfer of air-fuel mixture from the sub-chamber to the combustion chamber during an intake stroke.

20 Claims, 10 Drawing Sheets

(51) Int. Cl.
*F02M 35/10* (2006.01)
*F02M 35/104* (2006.01)
*F02B 75/02* (2006.01)
*F02B 75/32* (2006.01)
*F02B 33/06* (2006.01)
*F02B 33/30* (2006.01)
*F16H 21/36* (2006.01)
*F16J 9/28* (2006.01)

(52) U.S. Cl.
CPC ............ *F02B 75/32* (2013.01); *F02F 1/4285* (2013.01); *F02M 35/104* (2013.01); *F02M 35/10216* (2013.01); *F02B 2075/027* (2013.01); *F16H 21/365* (2013.01); *F16J 9/28* (2013.01)

(58) Field of Classification Search
CPC ..... F02M 21/0266; F02B 75/02; F02B 75/32; F02B 2075/027; F02B 33/06; F02B 33/30
See application file for complete search history.

(56) References Cited

U.S. PATENT DOCUMENTS

| | | | |
|---|---|---|---|
| 2,431,859 A * | 12/1947 | Fisher | F02B 25/00 123/47 A |
| 2,497,781 A | 2/1950 | Logashkin | |
| 3,149,543 A | 9/1964 | Naab | |
| 3,301,234 A * | 1/1967 | Reilly | F02B 25/00 123/47 R |
| 4,203,354 A | 5/1980 | Cunningham | |
| 4,629,200 A | 12/1986 | Ruddy | |
| 5,551,383 A | 9/1996 | Novotny | |
| 6,408,803 B1 | 6/2002 | Atkins | |
| 6,651,636 B1 | 11/2003 | Albright | |
| 6,729,290 B1 * | 5/2004 | Rorke | F01L 11/02 123/193.6 |
| 6,883,314 B2 | 4/2005 | Callas et al. | |
| 6,951,211 B2 | 10/2005 | Bryant | |
| 9,091,204 B2 * | 7/2015 | McAlister | F02F 3/24 |
| 9,828,886 B1 * | 11/2017 | Harmon, Sr. | F01L 31/00 |
| 10,087,818 B2 * | 10/2018 | Ocampo | F01L 11/02 |
| 2009/0151686 A1 * | 6/2009 | Nguyen | F01L 11/02 123/193.2 |
| 2009/0205338 A1 * | 8/2009 | Harmon, Sr. | F02G 5/02 60/677 |
| 2013/0037010 A1 * | 2/2013 | Pattakos | F02B 75/32 123/73 AV |
| 2015/0219007 A1 | 8/2015 | Mavinahally et al. | |
| 2021/0047982 A1 * | 2/2021 | Engelmann | F02F 3/042 |

FOREIGN PATENT DOCUMENTS

| | | |
|---|---|---|
| RU | 2622222 C1 | 6/2017 |
| RU | 2624156 C1 | 6/2017 |
| WO | WO2014/142686 A1 | 9/2014 |

* cited by examiner

A-A

C-C

INTERNAL COMBUSTION ENGINE

FIELD

This invention relates to an improved internal combustion engine that runs on a four-stroke cycle, more particularly, an improved internal combustion engine having multiple intake stages of the four-stroke cycle, and which uses air for cooling components of a piston assembly.

BACKGROUND

The four-strokes of an internal combustion engine consist of an intake stroke, compression stroke, power stroke, and an exhaust stroke. In a conventional internal combustion engine, during the intake stroke, an exhaust valve located in a cylinder head closes and an intake valve also located in the cylinder head opens, a piston moves downwards, and an air-fuel mixture is drawn into a combustion chamber. In the compression stroke, the intake valve closes and the piston moves upwards which causes the air-fuel mixture to compress. Following the compression, in the power stroke, a sparkplug located in the cylinder head sparks causing the air-fuel mixture to ignite, creating high pressure in the combustion chamber forcing the piston to be driven downwards. In the exhaust stroke, the exhaust valve located in the cylinder head opens and as the piston travels upwards, exhaust gas is forced out of the combustion chamber.

One drawback of the conventional four-stroke engine is the extensive maintenance required to ensure proper operation. An internal combustion engine achieves high temperatures during normal operation, which causes the engine components to reach high temperatures. In the case of the piston assembly, these high temperatures require the use of heat-resistant materials to construct the piston rings. Piston rings serve to both create a seal between the combustion gasses in the cylinder and to guide the piston as it travels its stroke length. Currently, various alloys of metal are used to make these rings, as metal is capable of operating under the high temperatures found in an internal combustion engine.

For example, metal piston rings which usually fit in grooves on the outer diameter of the piston require lubrication to operate. To achieve this, almost all presently produced internal combustion engines require the underside of the piston to be regularly coated in oil. This lubrication is applied to both the piston and cylinder wall, allowing the piston to travel smoothly along its stroke, supported by the piston rings. However, not all of this oil is scraped off the piston wall by the piston rings, meaning that some oil passes into the combustion chamber where it is burned. This is undesirable, as the combustion of oil produces harmful emissions. Furthermore, exposure of engine oil to high temperatures in conventional internal combustion engines results in a rapid breakdown of the oil, necessitating frequent oil replacements.

SUMMARY

One aspect of the invention relates to an internal combustion engine, and a method for implementing an internal combustion engine, including a hollow cylinder, a piston within the hollow cylinder, and a cylinder head. A base valve assembly at a base of the hollow cylinder permits or restricts fluid flow from an intake manifold into a sub-chamber below the piston. The piston includes at least one intake port connecting a combustion chamber above the piston with the sub-chamber, and a transfer valve that opens and closes the at least one intake port. When the transfer valve opens the at least one intake port, fluid is permitted to flow from the sub-chamber to the combustion chamber. The internal combustion engine operates according to a four-stroke piston cycle, wherein multiple intake stages are provided. The intake stages may include intake of air into the sub-chamber during a compression stroke, transfer of air from the sub-chamber to the combustion chamber during a power stroke, intake of air-fuel mixture into the sub-chamber during an exhaust stroke, and transfer of air-fuel mixture from the sub-chamber to the combustion chamber during an intake stroke.

In one embodiment, the internal combustion engine comprises: a hollow cylinder; a cylinder head; at least one exhaust valve disposed in the cylinder head for discharge of exhaust gases; at least one fuel injector; a piston within the hollow cylinder, the piston having at least one intake port that provides a passage for fluid flow through the piston; a transfer valve disposed within a transfer valve housing of the piston, the transfer valve being configured to render the at least one intake port of the piston in an opened or closed state; a base valve assembly disposed at a base of the cylinder that opens and closes to permit or restrict fluid flow into a sub-chamber below the piston; wherein the internal combustion engine operates according to a four-stroke piston cycle including multiple fluid intake stages; wherein during at least a first fluid intake stage the at least one intake port of the piston is in the opened state and an air-fuel mixture flows from the sub-chamber below the piston to a combustion chamber above the piston.

In one embodiment, during at least a second fluid intake stage the at least one intake port of the piston is in the closed state and the base valve assembly opens and permits an air-fuel mixture to flow from an intake manifold into the sub-chamber below the piston.

In one embodiment, during at least a third fluid intake stage the at least one intake port of the piston is in the closed state and the base valve assembly opens and permits air to flow from an intake manifold into the sub-chamber below the piston.

In one embodiment, the second fluid intake stage is during an exhaust stroke of the four-stroke piston cycle.

In one embodiment, the third fluid intake stage is during a compression stroke of the four-stroke piston cycle.

In one embodiment, a plurality of intake ports are disposed in the piston; wherein when the transfer valve is configured to render the plurality of intake ports of the piston in opened or closed states.

In one embodiment, the transfer valve opens when a fluid pressure in the sub-chamber is greater than a fluid pressure in the combustion chamber.

In one embodiment, the base valve assembly opens during a piston stroke when the piston is moving toward top dead center.

In one embodiment, an intake port is disposed within the cylinder head; wherein an intake valve is configured to render the intake port in the cylinder head in an opened and closed state; wherein the opened state permits fluid flow into the combustion chamber.

In one embodiment, the piston includes at least one piston ring; wherein the piston and the at least one piston ring are cooled by the fluid flowing through the at least one intake port in the piston from the sub-chamber to the combustion chamber.

In one embodiment, the at least one piston ring comprises a non-metal material.

In one embodiment, a purge valve is disposed within the cylinder head; wherein the purge valve is configured to open and close substantially at the same time that the at least one exhaust valve opens and closes.

In one embodiment, the internal combustion engine further comprises a connecting rod having one end attached to the piston and another end connected to a crank shaft assembly; wherein the crank shaft assembly includes a hypocycloidal drive.

In one embodiment, the hypocycloidal drive comprises a connecting rod journal, a main journal, an internal gear, and an external drive gear.

In one embodiment, the external gear is engaged at a pitch circle diameter of the internal gear.

Another aspect of the invention relates to a method for implementing an internal combustion engine, comprising providing: a hollow cylinder and a base valve assembly disposed at a base of the cylinder; a cylinder head; at least one exhaust valve disposed in the cylinder head for discharge of exhaust gases; at least one fuel injector; a piston within the hollow cylinder, the piston having a transfer valve and at least one intake port that provides a passage for fluid flow through the piston; using the transfer valve to open and close the at least one intake port of the piston; using the base valve assembly to permit or restrict fluid flow into a sub-chamber below the piston; and operating the internal combustion engine according to a four-stroke piston cycle including multiple fluid intake stages; wherein at least a first fluid intake stage comprises using the transfer valve to open the at least one intake port of the piston to allow an air-fuel mixture to flow from the sub-chamber below the piston to a combustion chamber above the piston.

In one embodiment of the method, at least a second fluid intake stage comprises using the transfer valve to close the at least one intake port of the piston and using the base valve assembly to open and permit an air-fuel mixture to flow from an intake manifold into the sub-chamber below the piston.

In one embodiment of the method, at least a third fluid intake stage comprises using the transfer valve to close the at least one intake port of the piston and using the base valve assembly to open and permit air to flow from an intake manifold into the sub-chamber below the piston.

In one embodiment of the method, the transfer valve opens when a fluid pressure in the sub-chamber is greater than a fluid pressure in the combustion chamber.

In one embodiment of the method, the base valve assembly opens during a piston stroke when the piston is moving toward top dead center.

In one embodiment of the method, a plurality of intake ports are disposed in the piston; wherein when the transfer valve is configured to render the plurality of intake ports of the piston in opened or closed states.

In one embodiment of the method, an intake port is disposed within the cylinder head; wherein an intake valve is configured to render the intake port in the cylinder head in an opened and closed state; wherein the opened state permits fluid flow into the combustion chamber.

In one embodiment of the method, the piston includes at least one piston ring; wherein the piston and the at least one piston ring are cooled by the fluid flowing through the at least one intake port in the piston from the sub-chamber to the combustion chamber.

In one embodiment of the method, the at least one piston ring comprises a non-metal material.

In one embodiment of the method, a purge valve is disposed within the cylinder head; wherein the purge valve is configured to open and close substantially at the same time that the at least one exhaust valve opens and closes.

In one embodiment of the method, the internal combustion engine further comprises a connecting rod having one end attached to the piston and another end connected to a crank shaft assembly; wherein the crank shaft assembly includes a hypocycloidal drive.

In one embodiment of the method, the hypocycloidal drive comprises a connecting rod journal, a main journal, an internal gear, and an external drive gear.

In one embodiment of the method, the external gear is engaged at a pitch circle diameter of the internal gear.

According to another aspect of the invention there is provided an internal combustion engine comprising a hollow cylinder, a piston within the hollow cylinder, and at least one piston ring that fits on an outer diameter of the piston. The hollow cylinder comprising a plurality of intake ports for intake of an air-fuel mixture, and a discharge port for discharge of exhaust gases. The piston comprising a transfer valve located within a transfer valve housing, and a plurality of radial intake ports. The transfer valve being configured to be in an opened or closed state. When the transfer valve is in the opened state the air fuel mixture is permitted to flow from a sub-chamber to a combustion chamber. The plurality of radial intake ports connecting the combustion chamber with the sub-chamber.

In one embodiment, the internal combustion engine comprises: a hollow cylinder comprising: a plurality of intake ports for intake of an air-fuel mixture, and a discharge port for discharge of exhaust gases; a piston within the hollow cylinder comprising: a transfer valve located within a transfer valve housing, the transfer valve being configured to be in an opened or closed state, when the transfer valve is in the opened state the air fuel mixture is permitted to flow from a sub-chamber to a combustion chamber; and a plurality of radial intake ports connecting the combustion chamber with the sub-chamber; and at least one piston ring that fits on an outer diameter of the piston.

In one embodiment, the sub-chamber is located below the piston.

In one embodiment, the air-fuel mixture transfers from an intake manifold to the sub-chamber via the plurality of radial intake ports.

In one embodiment, a valve type mechanism is used to open and/or close the plurality of radial intake ports.

In one embodiment, when the transfer valve is in the opened state, the air-fuel mixture transfers from the sub-chamber to the combustion chamber via the plurality of radial intake ports.

In one embodiment, when the transfer valve is in a closed state, the transfer valve obstructs the plurality of radial intake ports to restrict flow of the air-fuel mixture from the sub-chamber to the combustion chamber.

In one embodiment, the hollow cylinder comprises an additional intake port located within a cylinder's head.

In one embodiment, an intake valve permits passage of intake air through the additional intake port.

In one embodiment, the plurality of radial intake ports are located around a periphery of the piston.

In one embodiment, a plurality of heavy springs engage the transfer valve, providing a closing force on the transfer valve.

In one embodiment, the piston and the at least one piston ring are cooled by the air-fuel mixture passing through the plurality of intake ports from the sub-chamber to the combustion chamber.

In one embodiment, the at least one piston ring is a non-metal material and is Teflon.

In one embodiment, the internal combustion engine further comprises a connecting rod having one end attached to the piston and another end connected to a crank shaft assembly.

In one embodiment, the crank shaft assembly includes a crank shaft, an internal gear and a hypocycloidal drive.

In one embodiment, the hypocycloidal drive comprises the connecting rod journal, a main journal and an external drive gear.

In one embodiment, the main journal is fixed to the connecting rod journal on one end and fixed to the external drive gear on another end.

In one embodiment, the main journal fits within a bore of the crank shaft.

In one embodiment, the external gear rotates along an inside circumference of the internal gear during engine operation.

In one embodiment, the crank shaft rotates in an opposite direction to the external gear during engine operation.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Described herein is an internal combustion engine comprising a hollow cylinder opening at one end into an opening of a crank case, a piston within the hollow cylinder, and at least one non-metal piston ring or metal piston ring with a non-metal coating that fits on an outer diameter of the piston. The hollow cylinder may comprise a plurality of intake ports for the intake of an air-fuel mixture, and a discharge port for the discharge of exhaust gases. The piston may comprise a transfer valve located within a transfer valve housing, and a plurality of radial intake ports connecting the combustion chamber with a sub-chamber. The transfer valve may be configured to be in an opened or closed state, and when the transfer valve is in an opened state the air-fuel mixture may be permitted to flow from the sub-chamber to the combustion chamber.

Figure 1A:
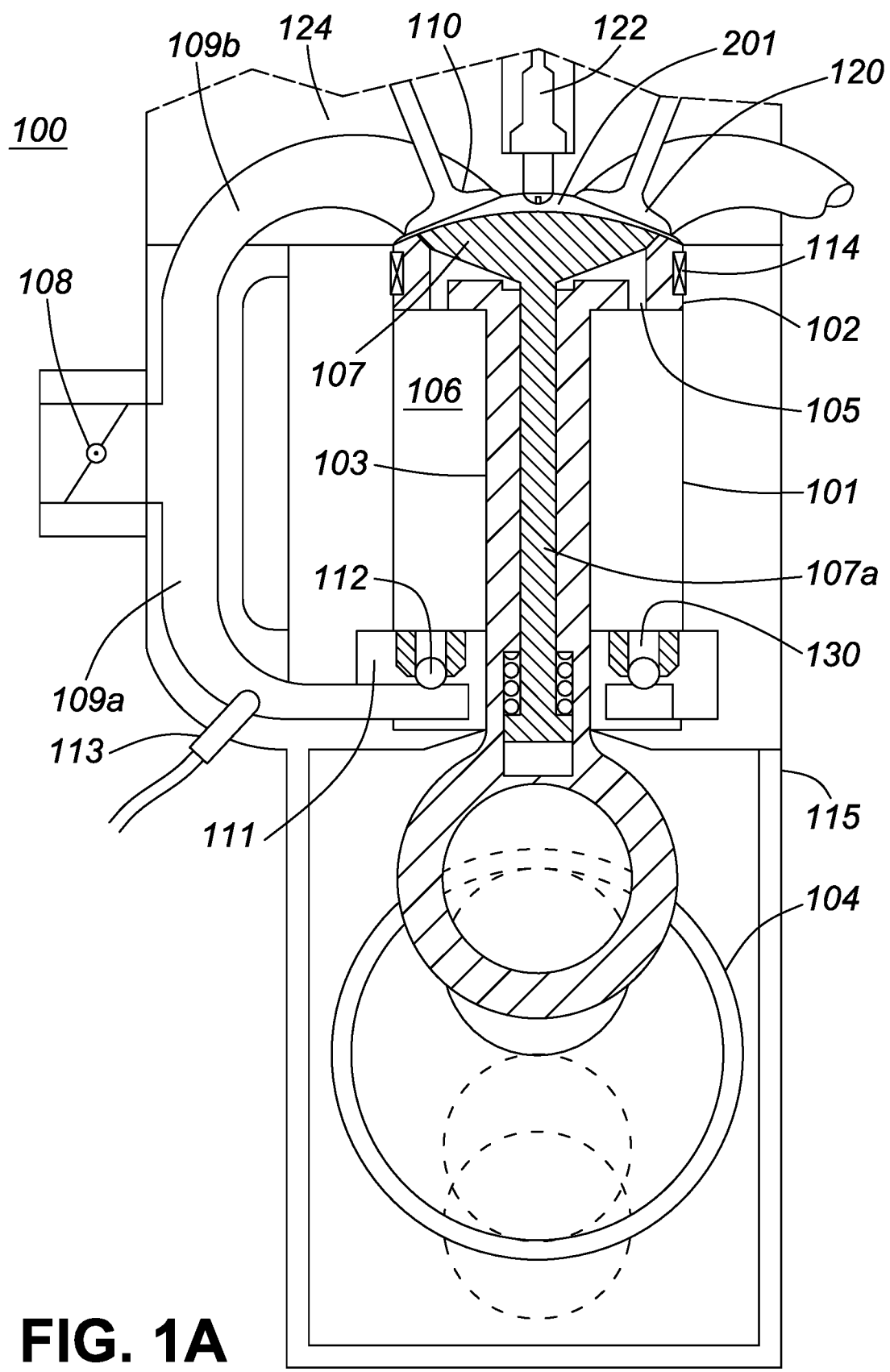
FIGS. 1A and 1B are vertical-cross sectional views of internal combustion engine assemblies, according to embodiments.
Figure 1B:
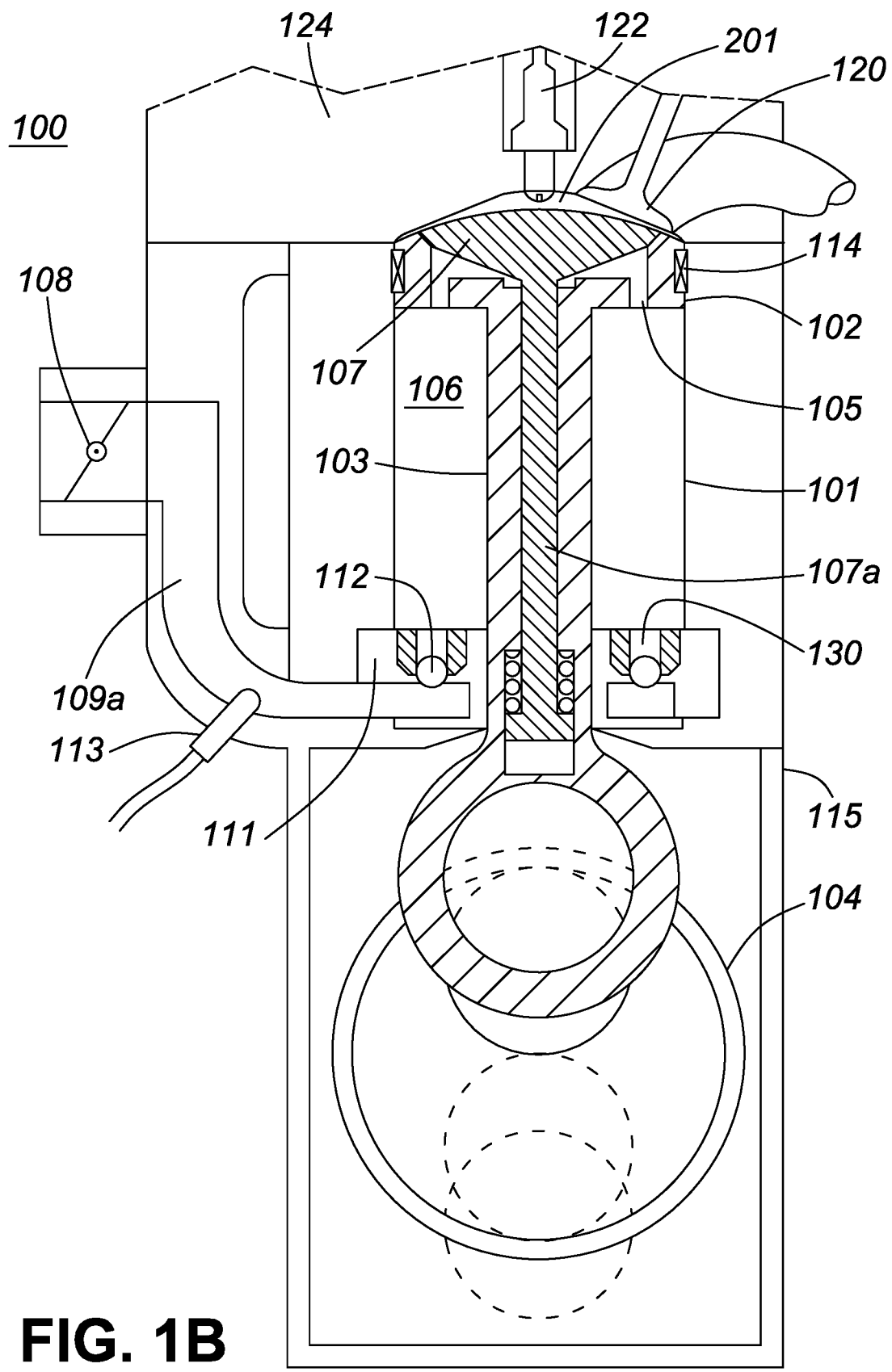

FIGS. 1A and 1B are vertical-cross sectional views of an internal combustion engine assemblies, according to embodiments. The embodiment of FIG. 1B is similar to that of FIG. 1A, except that it does not have an intake port and valve in the cylinder head. Referring to the embodiment of FIG. 1A, the internal combustion engine assembly 100 comprises a hollow cylinder 101 enclosed at one end by a cylinder head 124. A piston 102 reciprocates within the cylinder 101 by a connecting rod 103 connected to a crank shaft assembly 104 located in a crank case 115. The crank-shaft assembly 104 is supported by bearings, not shown, and is lubricated by oil in the crankcase. The piston 102 includes a plurality of radial intake ports 105 located around the periphery of the piston allowing fluid communication between a sub-chamber 106 and a combustion chamber 201. Although embodiments may also be implemented with only a single intake port 105, it will be appreciated from the features described herein that providing more than one intake port 105 is desirable since thermal performance (e.g., even heating and cooling across the piston 102) is improved and pressure within the cylinder is more uniform. At least one exhaust valve 120 and optionally at least one intake valve 110 are disposed in the cylinder head 124. In some embodiments, for example, those wherein a fuel is gasoline, a spark plug 122 may be disposed in the cylinder head 124. Other embodiments, for example, those using diesel fuel, may not have a spark plug.

The sub-chamber 106 is defined as the region within the cylinder located beneath the piston 102, while the combustion chamber 201 is defined as the region within the cylinder 101 located above the piston 102 and below the cylinder head 124. When the piston is at a top most point in the cylinder 101, the combustion chamber volume is minimized. In the illustrated embodiment, a transfer valve 107 is located within a housing in the piston 102. The position of the transfer valve 107 (i.e., the transfer valve 107 being in an opened or closed state) controls the inflow of air or an air-fuel mixture, depending on the stage of operation as will be described detail below, from the sub-chamber 106 to the combustion chamber 201. Air or an air-fuel mixture located within the sub-chamber 106 may flow through the radial intake ports 105 when the transfer valve 107 is in an opened state. However, in a case where the transfer valve 107 is in a closed state, the transfer valve 107 obstructs the radial intake ports 105, inhibiting the flow. In the embodiment of FIG. 1A, the transfer valve has a stem 107a that is retained (e.g., coaxially) within a housing, e.g., it is retained within the connecting rod 103 in a sliding fit to allow reciprocating movement and thus opening/closing of the transfer valve. The system for controlling the transfer valve 107 will be described in further detail below. The air or air-fuel mixture located within the sub-chamber 106 enters the sub-chamber 106 via inlets 130 controlled by a cylinder base valve assembly 111.

In the embodiment of FIG. 1A, a throttle body 108 may be used to control the inflow of intake air. When the throttle body 108 is open and permits the inflow of air, the air enters air intake manifolds 109a and optional intake manifold 109b which guide intake air from the throttle body 108 to the intake port(s). A first intake port may be located below the sub-chamber 106. The cylinder base valve assembly 111 controls fluid flow through the inlets 130 into the sub-chamber 106. The cylinder base valve assembly 111 may use, for example, ceramic balls 112 to permit or restrict fluids from entering the sub-chamber 106 from intake manifold 109a. This mechanism will be described in further detail below. It will be appreciated that although the cylinder base valve assembly 111 is depicted as using ceramic balls, the base valve assembly may instead comprise reed valves, rotary valves, or any other mechanism to restrict and permit fluid flow. Optionally, a second intake port may be located at the cylinder head. An intake valve 110 at the cylinder head may permit the inflow of air, an optionally an air-fuel mixture, through the intake port to the combustion chamber 201. An exhaust valve 120 at the cylinder head permits the flow of exhaust gases from the combustion chamber 201. It will be appreciated that the intake valve 110 and the exhaust valve 120 may be, for example, poppet valves. A fuel injector 113 may inject fuel into the manifold 109a leading to the base valve assembly 111 creating a mixture of air and fuel. The embodiment shown in FIG. 1A is capable of allowing air intake into the combustion chamber from two sources (i.e., intake air from the sub chamber 106 and intake air from the cylinder head via optional intake manifold 109b and intake valve 110 (see FIG. 1B wherein the intake manifold 109b and intake valve 110 are omitted). This configuration may increase the volume of air in the air-fuel mixture within the combustion chamber during engine operation. This increase in air volume may increase volumetric efficiency and improve engine performance.

In some embodiments, the fuel injector 113 may also or only inject fuel into the optional manifold 109b leading to the intake port located at the cylinder head. In some embodiments, the fuel injector may inject fuel into the intake manifold before the throttle body 108. In embodiments configured for use with diesel fuel, the fuel injector may be disposed in the cylinder head rather than the intake manifolds 109a, 109b, to inject fuel directly into the combustion chamber 201.

It will be appreciated that in some embodiments there may be only the one intake port permitting fluid flow into the sub-chamber 106 via intake manifold 109a. In this case, as shown in FIG. 1B, there would be no intake manifold 109b, intake valve 110, or intake port located in the cylinder head. In order for such an embodiment to function, air and fuel must be supplied to the combustion chamber. Therefore, the manifold 109a leading to the base valve assembly 111 includes the fuel injector 113 to supply fuel.

In the embodiments of FIGS. 1A and 1B, piston rings 114 are located on the outer circumference of the piston 102. The piston rings 114 may engage grooves in the outer circumference of the piston, such that they are captured, thereby substantially preventing their travel along the outer circumference of the piston. As previously described, an internal combustion engine achieves high temperatures during normal operation causing the engine components to reach high temperatures. Such high temperatures require the use of heat-resistant materials to form the piston rings. Conventionally, various alloys of metal have been used for constructing piston rings, as selected metals are capable of operating under high temperature conditions. According to embodiments of the invention, piston rings may be manufactured from or may include one or more non-metallic materials (e.g., as an outer layer or coating). Use of certain non-metallic materials, such as, for example, Teflon™, to form the piston rings advantageously allows the rings to be continuous; that is, without gaps as is typical of metal piston rings. As a result, non-metallic piston rings as described herein substantially prevent leakage of air-fuel mixture or exhaust gases (depending on the stage of the engine's operation), thereby contributing to one or more of improving efficiency, reducing emissions, and preventing contamination of the crankcase oil.

The embodiments of FIGS. 1A and 1B may use the cool air and air-fuel mixture to cool the piston 102 and piston rings 114 via heat transfer when the air or air-fuel mixture passes from the sub-chamber 106 to the combustion chamber 201 via the radial intake ports 105. The resulting cooler temperatures may enable the use of a non-metallic material to form the piston rings 114. For example, Teflon™ piston rings may be employed. It will be appreciated that Teflon is a low friction material; thus, the use of Teflon as a material for piston rings or a coating for piston rings may eliminate a need for oil lubrication of the cylinder walls. As a result, embodiments described herein may not require lubricating oil to be applied to the piston and cylinder walls if Teflon or other low-friction material is used to form the piston rings. Eliminating the use of oil will ensure that oil does not enter the combustion chamber of the engine, thus improving engine emissions.

It will be appreciated that oil may be used in the crank case 115 of the internal combustion engine assembly. To prevent any oil leakage from the crank case 115 to the sub-chamber 106 and similarly to prevent air leakage from the sub-chamber 106 to the crank case 115, the sub-chamber 106 and crank case 115 may be completely sealed at their interface. The connecting rod 103, which connects the crank shaft assembly 104 to the piston 102, can act to block the passageway that connects the crank case 115 and sub-chamber 106. The connecting rod 103 may be enclosed along a portion of its length within a cylindrical bore. The girth of the cylindrical bore may be such that it can sufficiently enclose the passageway in which the crank case 115 interfaces the sub-chamber 106. In addition, radial shaft seals may surround the cylindrical bore to further prevent cross leaking by sealing against the connecting rod 103 while allowing its reciprocating travel during operation of the internal combustion engine. These seals may be, for example, PTFE seals or equivalents.

Figure 2:
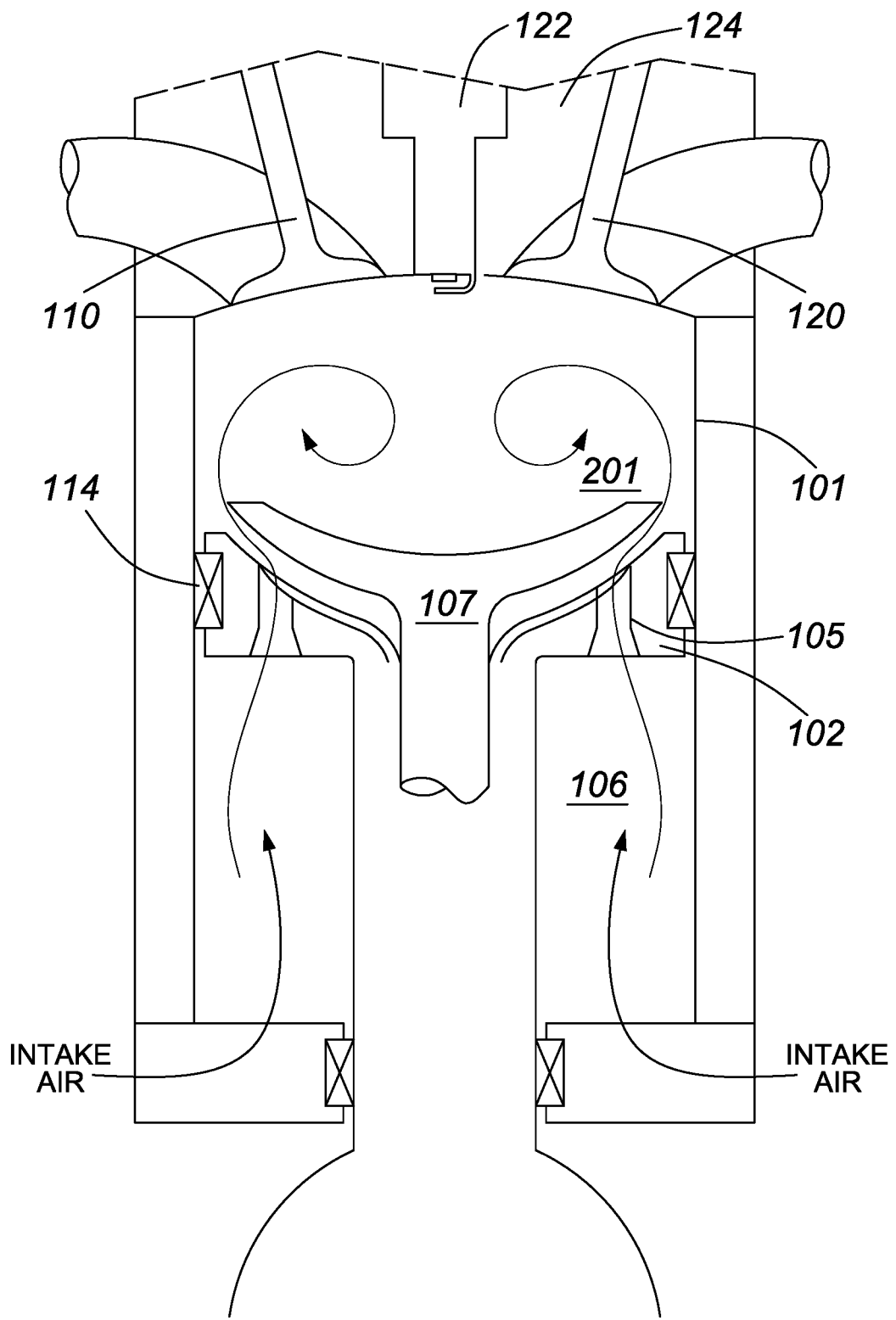
FIG. 2 is a vertical cross-sectional view of an internal combustion engine assembly, according to one embodiment.

FIG. 2 is a more detailed vertical cross-sectional view of an internal combustion engine assembly, according to one embodiment, at an instance during the operation cycle when the piston 102 is situated at a middle point in the cylinder 101. Referring to FIG. 2, the transfer valve 107 is in an opened state allowing the air-fuel mixture located in the sub-chamber 106 to enter the combustion chamber 201. In this configuration, the piston 102 and piston rings 114 can be cooled when cool air and the air-fuel mixture passes from the sub-chamber 106 to the combustion chamber 201 via the radial intake ports 105. As previously described, the resulting cooler temperatures enable the use of piston rings 114 made from or coated with non-metal materials. For example, Teflon-coated piston rings may be employed.

Figure 3:
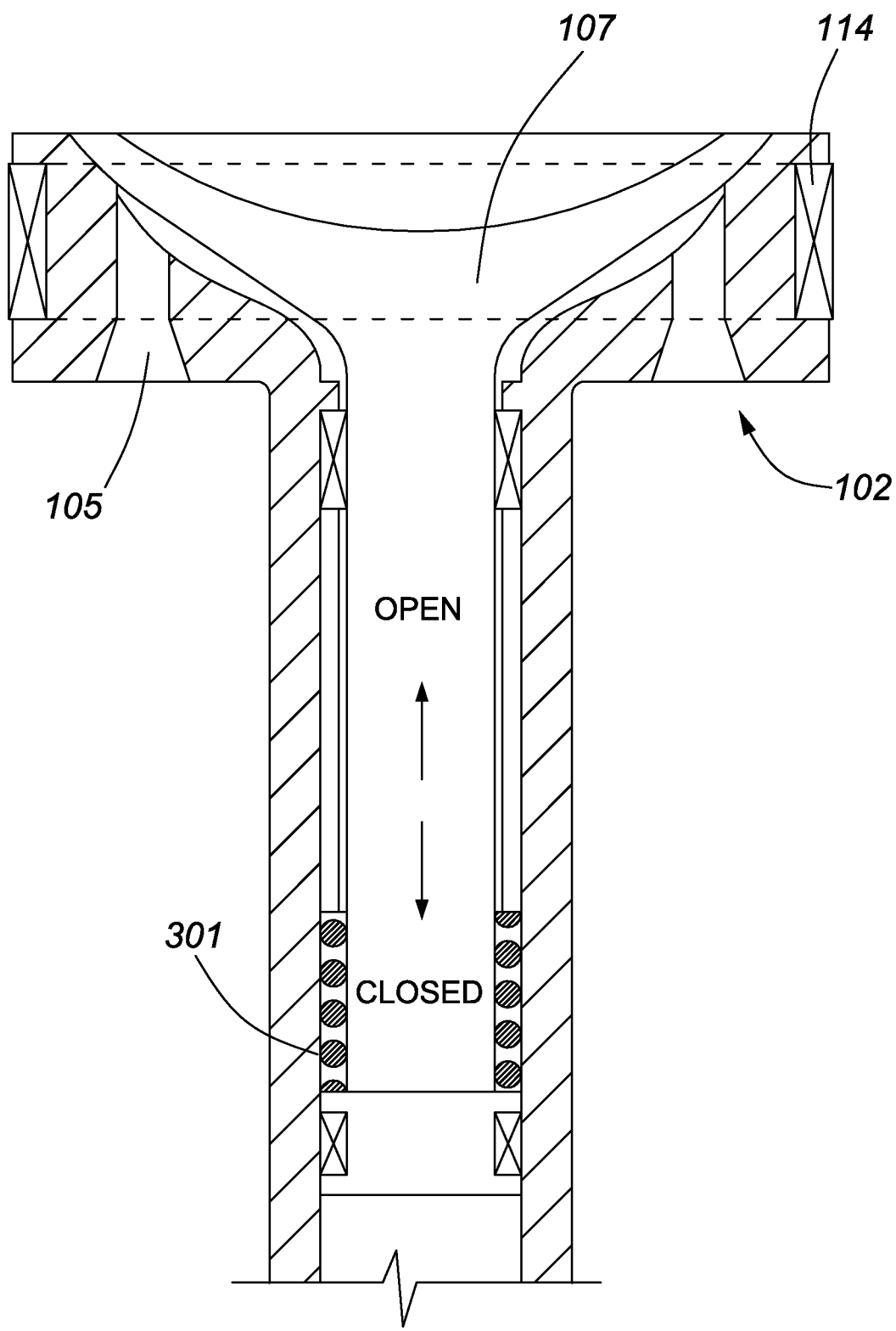
FIG. 3 is a detailed vertical cross-sectional view of a piston assembly, according to one embodiment.

FIG. 3 is a detailed vertical cross-sectional view of a piston assembly, according to one embodiment. As previously described, the transfer valve 107 can operatively be set to a closed state or an opened state. During normal operation of the internal combustion engine, the transfer valve cycles between closed and open states. As shown in FIG. 3, a spring 301 may engage the stem 107a of the transfer valve 107 providing a restoring force which would cause the transfer valve 107 to return back to a closed state from an open state. In order for the transfer valve 107 to be opened, the force generated by the air or air-fuel mixture pressure in the sub-chamber 106 as the piston 102 moves downwards must be large enough to overcome the effects of the spring 301 restoring force. In such a case, when the transfer valve 107 is opened and the piston 102 is moving downwards, the air or air-fuel mixture in the sub-chamber 106 is drawn into the combustion chamber 201, and in the process the air or air-fuel mixture may cool the piston 102 and piston rings 114 via heat transfer. As previously described, this cooling effect enables the use of non-metallic piston rings or non-metallic piston ring coatings which may eliminate a need for piston and cylinder oil lubrication.

Figure 4:
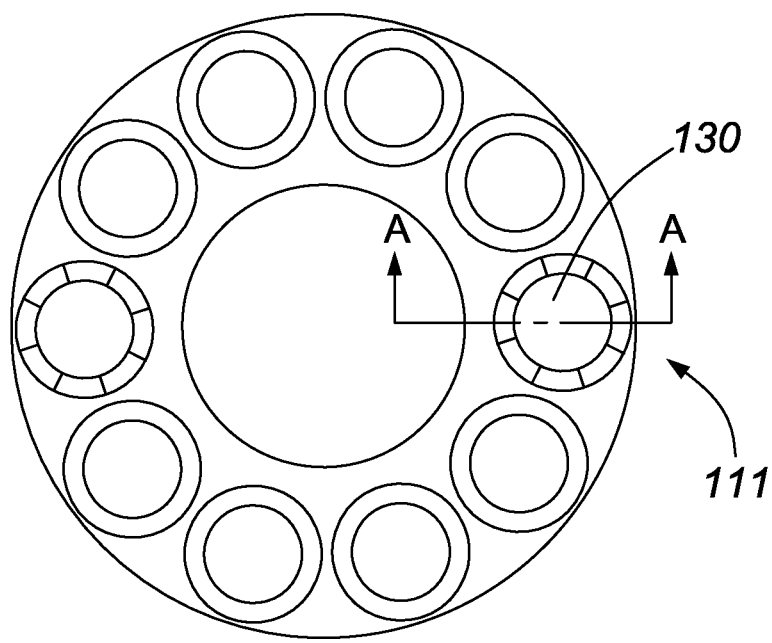
FIG. 4 is a horizontal cross-sectional view of a base valve assembly, according to one embodiment.

FIG. 4 is a horizontal cross-sectional view of the base valve assembly 111, according to one embodiment. In order to control the air or air-fuel mixture flow from the intake manifold 109a to the sub-chamber 106, the air-fuel mixture inlet passages 130 must be opened and closed based on pressure conditions. For example, in the embodiment of FIG. 4 ceramic balls 112 (see FIGS. 1A and 1B) may be employed which can operatively open or close the inlet passages 130 based on pressure conditions. In the embodiment of FIG. 4, there may be about ten inlets 130 which allow the flow of the air-fuel mixture from the intake manifold 109a to the sub-chamber 106. Each one of these ten inlets 130 uses a ceramic ball to permit or restrict fluid movement. Although ten inlets are depicted, it will be appreciated that a different number of inlets could be employed without deviating from the desired result.

Figure 5:
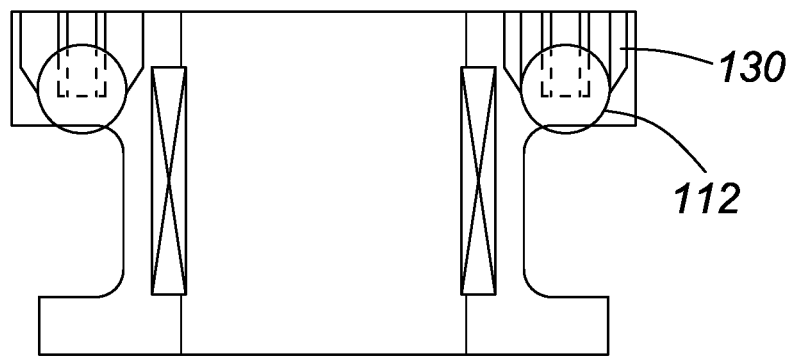
FIG. 5 is a vertical cross-sectional view of a base valve assembly, according to one embodiment.

FIG. 5 is a vertical cross-sectional view of the base valve assembly 111 of FIG. 4. Referring to FIG. 5, ceramic balls 112 are shown in position for obstructing inlet openings 130 to prevent fluid flow to the sub-chamber 106. The area above the inlet passages may be the sub-chamber 106. The area below the inlet passages may be the intake manifold 109a. The inlet passages are in fluid communication with the intake manifold 109a which contains air or the air-fuel mixture, depending on the stage of the engine operation cycle.

Figure 6:
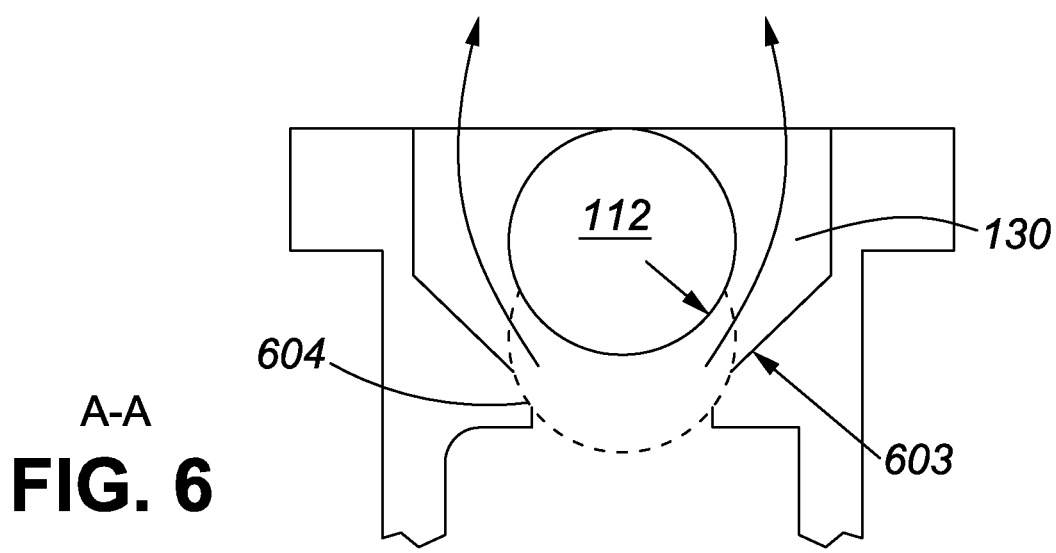
FIG. 6 is an enlarged sectional view taken generally on line A-A of FIG. 4.

FIG. 6 is an enlarged sectional view of an inlet 130 of the base valve assembly 111, taken generally along line A-A of FIG. 4. In a closed state the ceramic ball 112, show with dashed line, rests in a seating area 604, obstructing any fluid flow through the inlet 130. In an open state the ceramic ball 112, shown with solid line, is lifted from the seating area 604, creating opening 603 to permit fluid flow through the inlet 130. In an opened state 602, the air or air-fuel mixture located in the intake manifold 109a can enter the sub-chamber 106, as represented by the curved arrows. A retainer (not shown) disposed above the ceramic ball in the open state 602 limits the distance travelled away from the seating area 604 in the opened state 602. The movement of the ceramic balls 112 from the closed state to the opened state is governed by pressure conditions in the sub-chamber 106. In some embodiments the retainer may include a spring or other biasing device to maintain the ceramic ball biased in the seated (closed) position, but still allow the ceramic ball to move to the open position under appropriate pressure conditions. The ceramic balls 112 may open during upward travel of the piston (i.e., toward the combustion chamber) to provide additional intake stroke stages, e.g., during the compression and exhaust strokes, to permit air or air-fuel mixture to enter the sub-chamber and subsequently enter the combustion chamber 201. The movement of the ceramic balls 112 is further explained with reference to FIGS. 10A and 10B.

Figure 7:
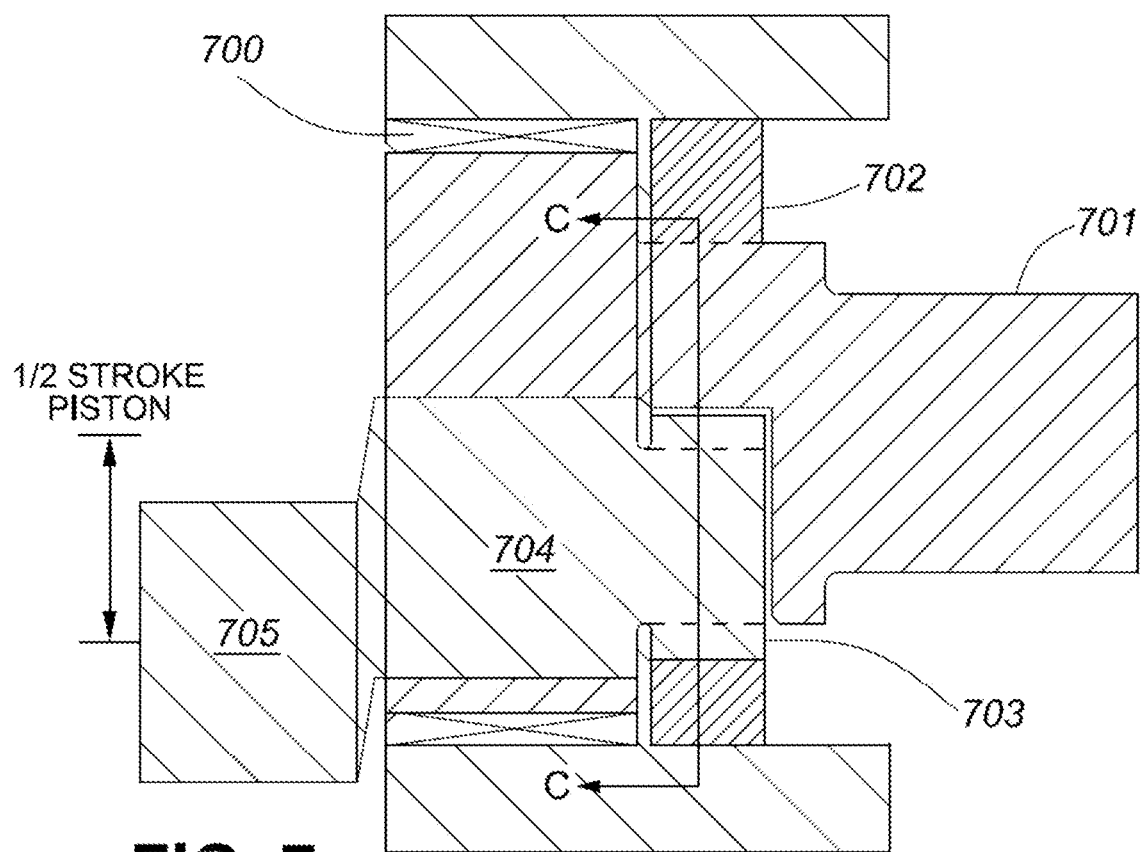
FIG. 7 is a side view of a crank shaft assembly, according to one embodiment.

FIG. 7 is a side view of a crank shaft assembly 715, according to one embodiment. In this embodiment the crank shaft assembly 715 includes a hypocycloidal gear assembly (shown in FIG. 8). The crank shaft assembly 715 includes a crank shaft 701, an internal stationary gear 702 (hereinafter referred to as "internal gear"), and a main hypocycloidal drive. The main hypocycloidal drive includes multiple components which may be fixed to one another. In some embodiments, the hypocycloidal drive is a single part which includes the multiple components. The main hypocycloidal drive may include a connecting rod journal 705, a main journal 704, and an external drive gear 703 (hereinafter referred to as "external gear"). The main journal 704 fits within a bore of the crank shaft 701 and governs the rotation of the crank shaft. The external gear 703 rotates within the inner circumference of the internal gear 702 during operation. The teeth of the external gear 703 engage the teeth of the internal gear 702. The crank shaft 701 rotates freely without interfering with the internal gear 702 or external gear 703. The rotation of the crank shaft 701 may be in a direction opposite the direction of the internal gear 703, which rotates along the stationary gear 702 during operation.

The connecting rod journal 705 may be fixed to a main journal 704 which is fixed to the external gear 703. It will be appreciated that during a four-stroke cycle, the piston and connecting rod are forced upwards and downwards along a length of the cylinder. As a result, the connecting rod journal 705 which may be fixed to the main journal 704 is likewise moved outwards and inwards in a sinusoidal motion. In this embodiment, the main journal 704 is moved in a straight line from a top center of the internal gear 702 to a bottom center of the internal gear 702. Since the main journal 704 is fixed to the external gear 703, the vertical motion of the main journal 704 causes the external gear 703 to be rotated in the inner circumference of the internal gear 702. Similarly, as the main journal 704 fits within a bore of the crank shaft 701, the vertical motion of the main journal 704 causes the crank shaft 701 to be rotated. When the crank shaft 701 is being rotated, the external gear 703 rotates along the inside circumference of the internal gear 702 in an opposite direction. It will be appreciated that rotational speed of the crank shaft 701 will be governed by a rotational speed of the external gear 703.

The sinusoidal (i.e., reciprocating) motion of the connecting rod is required for the two chamber engine design (i.e., combustion chamber 201 and sub-chamber 106). As described above, the interface between the sub-chamber and the crank case is sealed to achieve the two chamber design. In this case, the connecting rod, which connects the crank shaft assembly to the piston, acts to block the passageway between the crank case and sub-chamber. A cylindrical bore surrounds a portion of the connecting rod to provide the necessary girth to sufficiently enclose the passageway in which the crank case 115 interfaces the sub-chamber 106. It will be appreciated that the connecting rod does not move at an angle as any angled movement may prevent the connecting rod from freely moving through the narrow passageway (i.e., the cylindrical bore) between the crank case and sub-chamber. Further, angled movement of the connecting rod may result in unwanted contact with the wall of the passageway between the crank case and sub-chamber.

Figure 8:
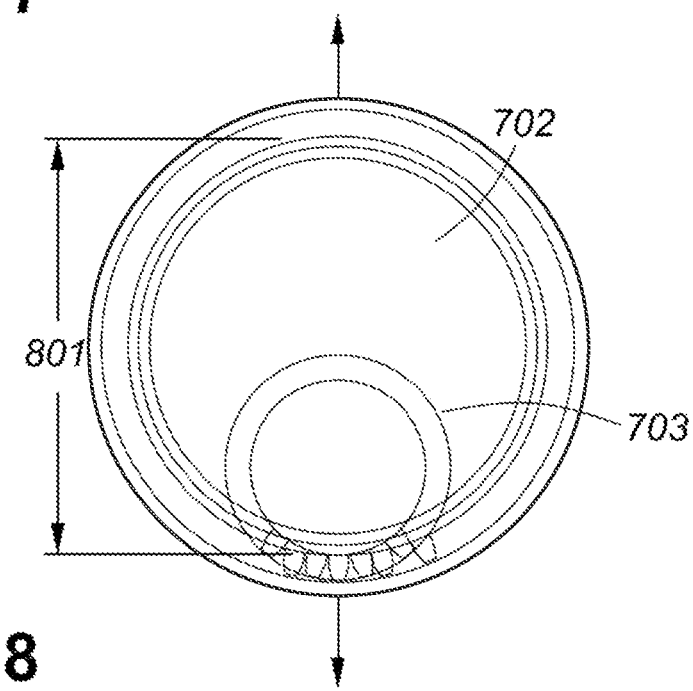
FIG. 8 is a sectional view taken generally on line A-A of FIG. 7.

FIG. 8 is a sectional view taken generally along line A-A of FIG. 7, showing the hypocycloidal gear assembly, according to an embodiment wherein the external gear 703 is configured to be driven around the internal gear 702. It will be appreciated that the diameter 801 of the internal gear 702 may correspond to the length of the piston stroke. That is, the external gear 703 may be engaged at pitch circle diameter of the internal gear 702.

Figure 9:
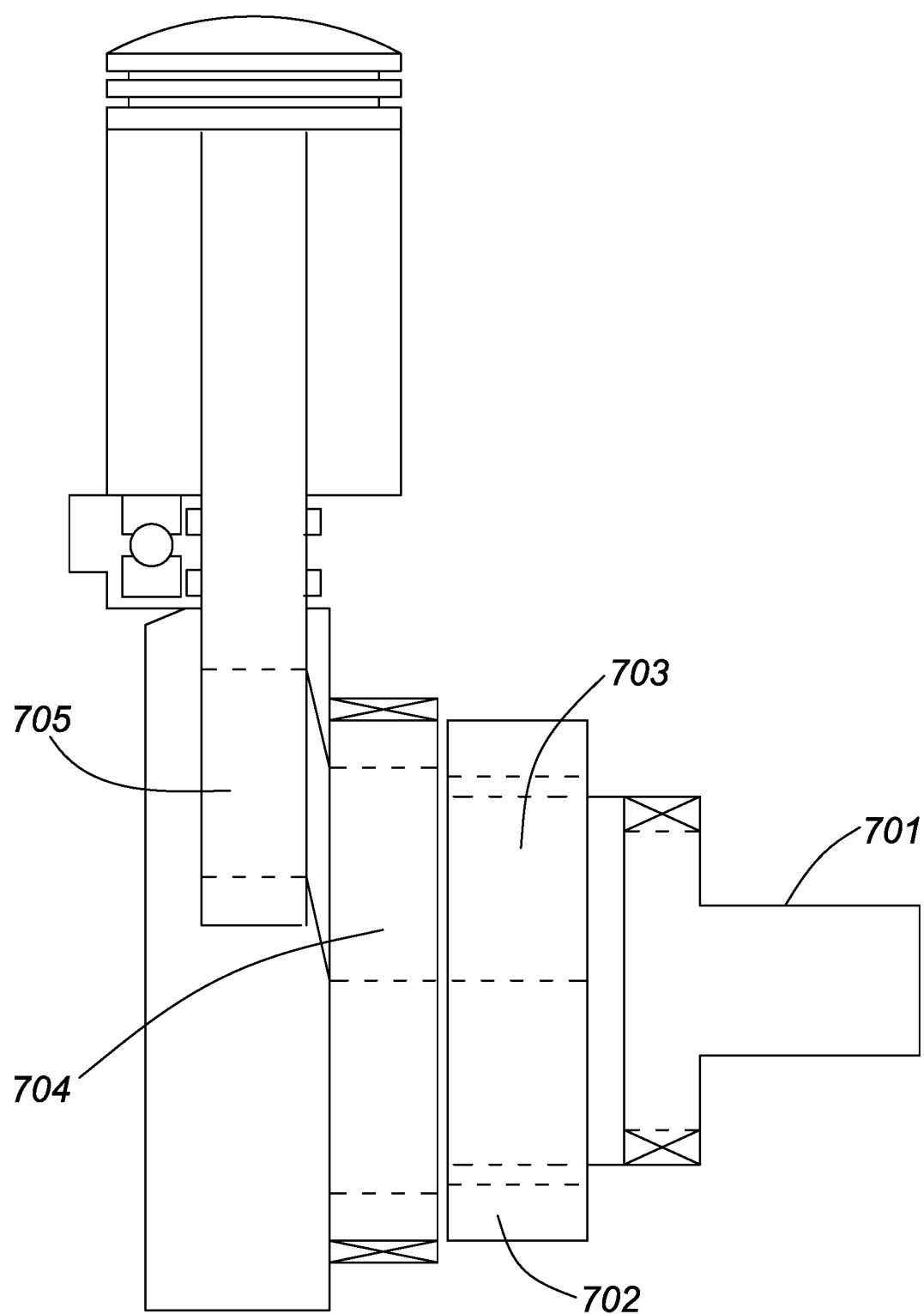
FIG. 9 is a vertical cross-sectional view of an internal combustion engine, according to one embodiment.

FIG. 9 is a vertical cross-sectional view of an internal combustion engine according to one embodiment. As shown in FIG. 9, the internal combustion engine may include a crank shaft assembly 715 that uses a hypocycloidal gear train. The connecting rod journal 705 of the connecting rod is fixed to the main journal 704 which is further fixed to the external gear 703. The main journal 704 may fit within a bore of the crank shaft 701 and may govern the rotation of the crank shaft 701. The external gear 703 rotates within the inner circumference of the internal gear 702 during operation.

Figure 10A:
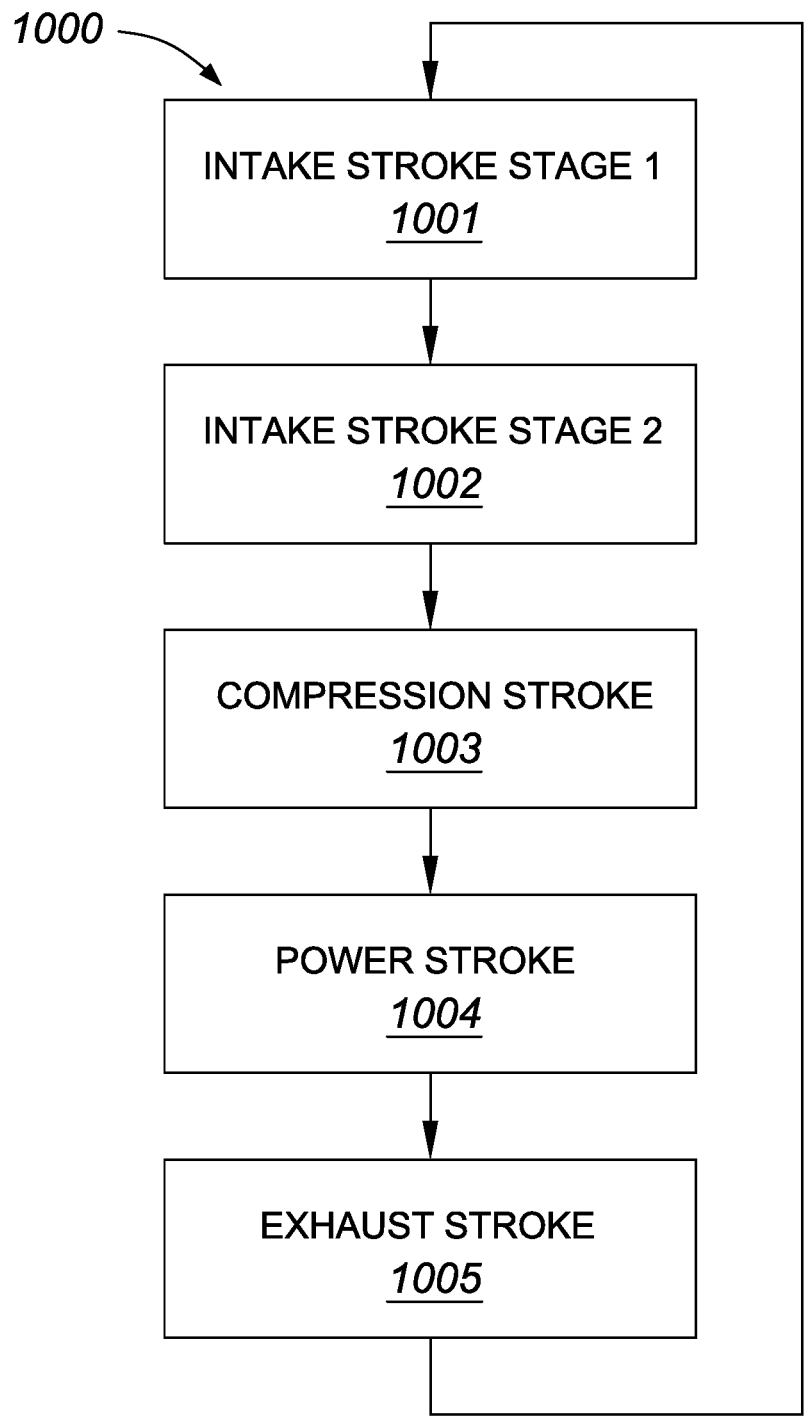
FIGS. 10A and 10B are flow diagrams illustrating stages of engine cycles for internal combustion engines according to embodiments described herein.
Figure 10B:
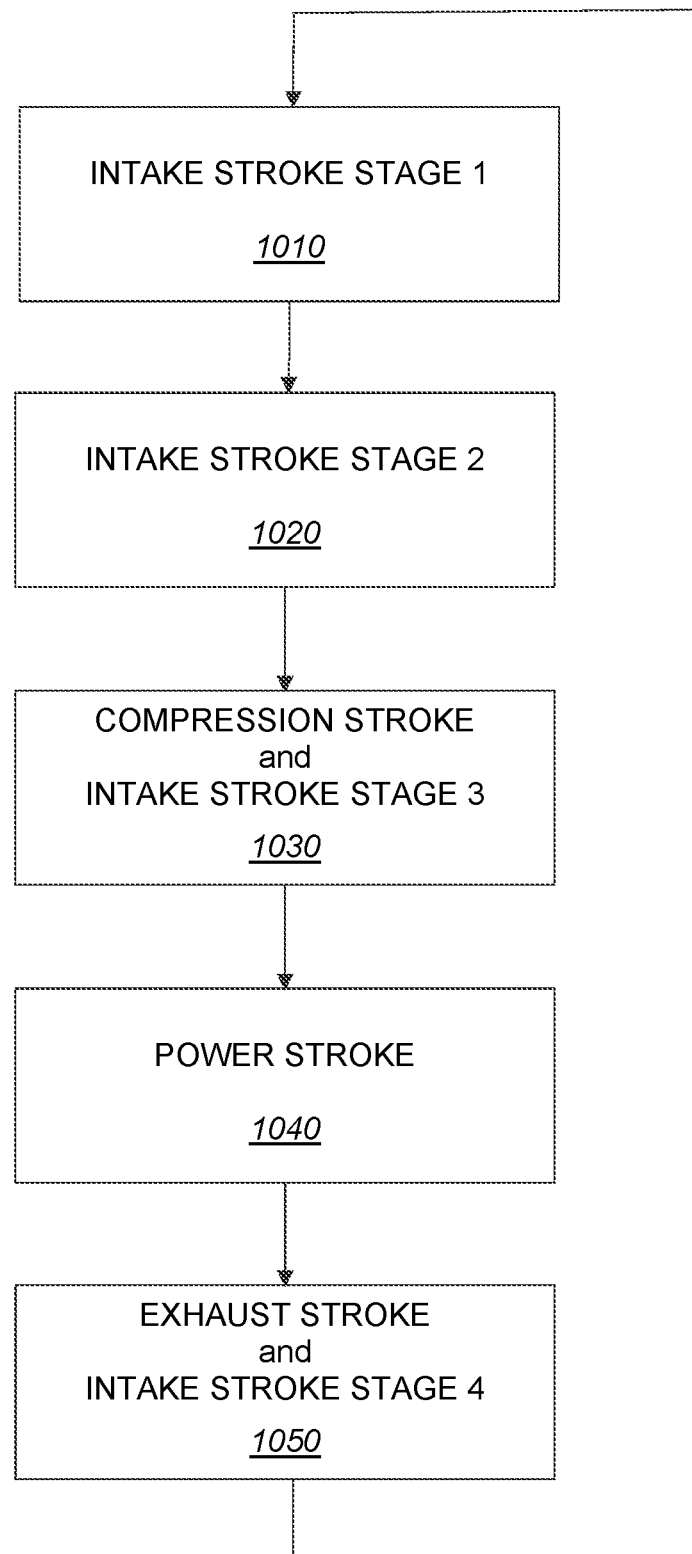

FIGS. 10A and 10B are flow diagrams illustrating engine cycles for internal combustion engines according to embodiments described herein. The cycles may be similar to a 4-stroke cycle of a conventional internal combustion engines. However, since the combustion chamber may receive an air-fuel mixture or air from two different sources (namely, air or air-fuel mixture received via an optional intake valve 110 in the cylinder head and air-fuel mixture received via the transfer valve 107), the opening and closing of valves in the embodiments is different from the 4-stroke cycle of a conventional internal combustion engines. FIGS. 10A and 10B will be discussed below with reference to the embodiments of FIGS. 1A, 1B, and 2-6, although it will be appreciated that FIGS. 10A and 10B are generally applicable to other embodiments.

Operation according to one embodiment will now be described with reference to FIG. 10A. The cycle may begin with stage 1 of the intake stroke 1001. At this stage, the exhaust valve located in the cylinder's head is closed and the intake valve located in the cylinder head is opened, allowing air to enter the combustion chamber. As the piston moves downwards air or air-fuel mixture is drawn through the intake valve into the combustion chamber. During stage 1 of the intake stroke 1001, the transfer valve may remain closed. As the capacity of the sub-chamber is reduced, the pressure in the sub-chamber is increased.

Stage 2 of the intake stroke 1002 may commences as the piston continues to travel toward the bottom of its stroke. The intake valve in the cylinder head is closed. It will be appreciated that due to the high pressure in the sub-chamber, the transfer valve located in the piston is opened, causing the air-fuel mixture to move from the sub-chamber to the combustion chamber. Once the piston reaches the bottom of the cylinder, the compression stroke 1003 begins.

In the compression stroke 1003, the transfer valve closes and the piston may move upwards causing the air-fuel mixture to compress. As the piston moves upwards, the base valve assembly opens and air is drawn into the sub-chamber. Following the compression, in the power stroke 1004, a sparkplug located in the cylinder's head sparks, causing the air-fuel mixture to ignite, which creates a high pressure. This high pressure drives the piston downwards.

Following the power stroke 1004, in the exhaust stroke 1005, the exhaust valve located in the cylinder's head is opened causing exhaust gases to be expelled as the piston moves upwards. As the piston moves upwards, the base valve assembly opens and air-fuel mixture is drawn into the sub-chamber. The cycle may then repeat starting at the intake stroke 1001.

Operation according to another embodiment will now be described with reference to FIG. 10B. The cycle may begin with stage 1 of the intake stroke 1010. At this stage, the exhaust valve 120 located in the cylinder head is closed and the intake valve 110 located in the cylinder head is opened, allowing air or air-fuel mixture to enter the combustion chamber 201 as the piston 102 moves downwards. In embodiments where a fuel injector injects fuel into the air intake manifold 109b, an air-fuel mixture is drawn into the combustion chamber via the open intake valve 110. During stage 1 of the intake stroke 1010, the transfer valve 107 is closed. As the piston begins to move downward the pressure level in the sub-chamber increases and the ceramic balls 112 are returned to their seated positions, thus impeding any fluid flow from the intake manifold 109a through the inlets 130 to the sub-chamber 106. The piston reaches BDC.

Stage 2 of the intake stroke 1020 may then commence. The intake valve 110 in the cylinder head is closed and the piston continues to move downwards. It will be appreciated that due to the high pressure in the sub-chamber, the transfer valve 107 located in the piston 102 is opened, causing the air-fuel mixture to move from the sub-chamber to the combustion chamber. The intake of the air-fuel mixture into the combustion chamber proceeds as the piston moves further downwards, eventually reaching the bottom of the cylinder (i.e., the bottom of its stroke, or bottom dead center (BDC)). Once the piston reaches the bottom of the cylinder, the compression stroke 1003 begins.

The compression stroke and intake stage 3 1030 begins as the piston begins to travel towards TDC. The intake valve 110 in the cylinder head and the transfer valve are closed, and the piston moves upwards causing the air-fuel mixture in the combustion chamber 201 to compress. The upward movement of the piston creates a low pressure environment in the sub-chamber, resulting in the ceramic balls 112 of the base valve assembly 111 being lifted from their seated position (FIG. 6), thereby opening the inlets 130. Air is drawn from the intake manifold 109a into the sub-chamber due to the low-pressure environment within the sub-chamber. The compression stroke ends when the piston reaches the top of its stroke (TDC)

Following the compression, in the power stroke 1040, the sparkplug 122 located in the cylinder head sparks, causing the air-fuel mixture in the combustion chamber to ignite, which creates a high pressure. This high pressure drives the piston downwards towards BDC, which compresses the air in the sub-chamber. The exhaust valve is opened early, before the piston reaches BDC. For example, after maximum brake torque (e.g., at about 60 degrees past TDC), the exhaust valve is opened. As the piston continues its downward movement the pressure in the sub-chamber continues to increase and the pressure in the combustion chamber continues to decrease, until the pressure in the sub-chamber exceeds the pressure in the combustion chamber, which causes the transfer valve to open. As a result, the air in the sub-chamber flows into the combustion chamber. The piston reaches BDC.

Following the power stroke 1040, in the exhaust stroke 1050, the transfer valve 107 is closed as the piston travels upwards from BDC. The exhaust valve 120 located in the cylinder head is opened causing exhaust gases to be expelled from the combustion chamber. Also, as the piston moves upwards there is intake stage 4, wherein the base valve assembly 111 opens and air-fuel mixture is drawn into the sub-chamber 106 through the inlets 130. The exhaust valve closes as the piston reaches TDC and the cycle then repeats starting at the first stage of the intake stroke 1010.

Thus, embodiments are different from conventional 4-stroke engines at least in that there are two or three intake stroke stages wherein one stage uses an intake valve disposed in the cylinder head and other stages use base valve assembly, sub-chamber, and a transfer valve disposed in the piston. Moreover, one intake stage may include the intake of air only into the sub-chamber, which may be used to aid expelling exhaust gases during the exhaust stroke. Further, the sub-chamber and transfer valve enable intake stroke stages simultaneously when the piston travels towards TDC, i.e., during the compression stroke and during the exhaust stroke. As noted above, embodiments may be implemented without an intake valve. Such embodiments operate as described above, with the intake valve omitted.

Figure 11A:
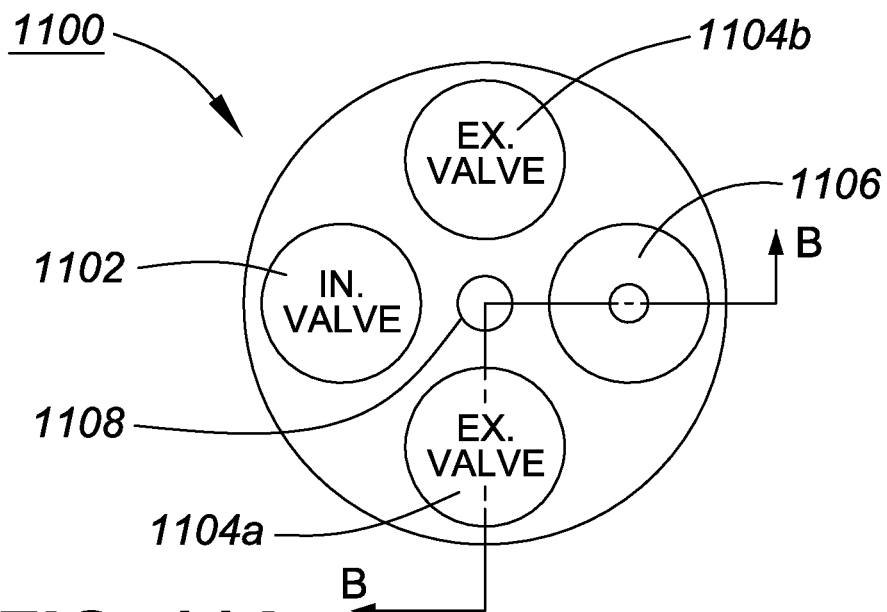
FIGS. 11A and 11B are diagrams of a cylinder head and a purge valve assembly, according to embodiments described herein.
Figure 11B:
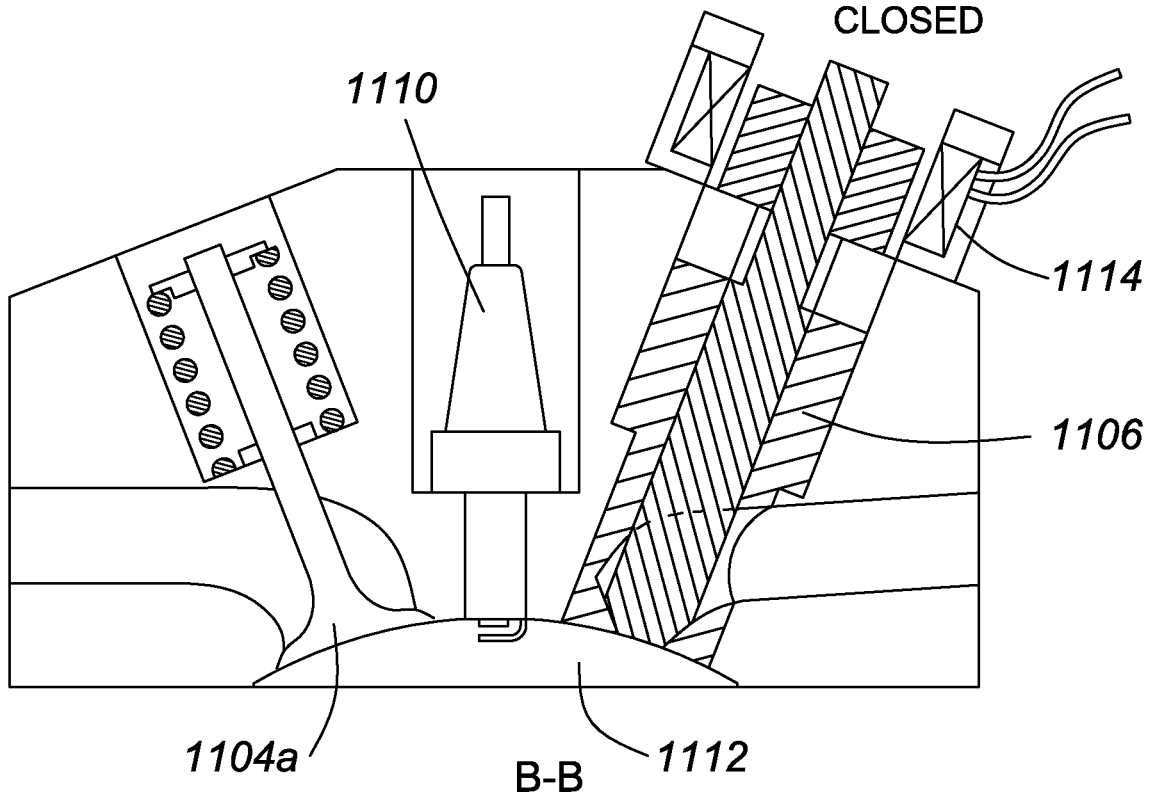

FIGS. 11A and 11B are diagrams of a cylinder head according to another embodiment. Referring to FIG. 11A, a plan view of the inside of the cylinder head 1100 is shown. This embodiment includes an intake valve 1102, two exhaust valves 1104a, 1104b, a purge valve assembly 1106, and an opening 1108 to accommodate a spark plug. In other embodiments for internal combustion engines that do not require spark plugs, the opening 1108 for the spark plug may be omitted. FIG. 11B is a sectional view of the cylinder head of FIG. 11A through line B-B. In the embodiment of FIGS. 11A and 11B the purge valve assembly 1106 is located radially faced outwards on 0 degrees datum line at 90 degrees from the surface of the combustion chamber 1112. The purge valve is used in conjunction with one or more exhaust valves, e.g., 1004a, 1004b, rotated 90 degrees, or + or −90 degrees, to suit design needs. In the embodiment of FIGS. 11A and 11B the intake (boost) valve 1102 is arranged approximately 180 degrees from the purge valve assembly 1106 at 90 degrees to combustion chamber surface. It will be appreciated that other arrangements of the three different valves types (intake, exhaust, purge) are possible, according to design requirements, and there may be one or more of each of the three different valves types (intake, exhaust, purge). It will also be appreciated that the cylinder head of FIGS. 11A and 11B, or variants thereof including a purge valve assembly, may be used together with the features described above in respect of embodiments shown in FIGS. 1 to 9.

The purge valve assembly 1106 may have multiple functions, according to various embodiments. For example, by partially or fully opening the purge valve assembly it can be used as a starting aid to lower or completely remove compression, allowing the use of smaller (i.e., lower amperage) starter motors and batteries. This allows the engine to spin faster during starting, and the purge valve assembly may then be closed when the engine starts running.

The purge valve assembly may also be used to improve performance and economy. As mentioned above, embodiments described herein operate according to a 4-stroke sequence that is different from conventional 4-stroke internal combustion engines. The embodiment of FIGS. 11A and 11B exemplifies additional differences relative to conventional 4-stroke engines. Operation of this embodiment which includes a purge valve is similar to previous embodiment and may also be described with reference to FIG. 10B, using reference numerals for features in common with FIGS. 1 to 9. The 4-stroke sequence may start on the exhaust stroke before the piston 102 reaches bottom dead center (BDC). The exhaust valves 1104a, 1104b and purge valve assembly 1106 are already open, and the transfer valve 107 in the piston 102 is closed. The piston starts to travel toward top dead center (TDC) during the exhaust stroke, and in doing so draws air-fuel mixture through the cylinder base valve assembly 111 of the sub chamber 106, filling the sub chamber with air-fuel mixture. This may be referred to as exhaust/intake stroke stage 4, 1050 in FIG. 10B.

When the piston reaches about 20 degrees before TDC (BTDC) the exhaust valves 1104a, 1104b and purge valve 1106 closes, then the piston reaches TDC and begins to travel to BDC. The transfer valve 107 is closed. The intake valve 1102 in the cylinder head opens and the base valve assembly closes, allowing air or air-fuel mixture to enter the combustion chamber 201 through the intake valve 1102 as the piston 102 moves downwards. In embodiments where a fuel injector injects fuel into the air intake manifold 109b, an air-fuel mixture is drawn into the combustion chamber via the open intake valve 1102. This may be referred to as intake stroke stage 1 (1010 in FIG. 10B).

As the pistons moves toward BDC the intake valve 1102 closes and the pressure in the sub-chamber increases. Due to the high pressure in the sub-chamber the transfer valve opens and air-fuel mixture in the sub-chamber is transferred through the transfer valve into the combustion chamber 1112. The intake of the air-fuel mixture into the combustion chamber proceeds as the piston moves further downwards, eventually reaching the bottom of the cylinder (i.e., the bottom of its stroke, or bottom dead center (BDC)). This may be referred to as intake stroke stage 2 (1020 in FIG. 10B).

Once the piston reaches BDC, the compression stroke and intake stroke stage 3 (e.g., 1030 in FIG. 10B) begins. The intake, exhaust, and purge valves are closed and the piston travels to TDC, compressing the air-fuel mixture in the combustion chamber. At the same time the base valve assembly opens, and the sub-chamber 106 fills with air only. At an instant before TDC (e.g., about 5 degrees BTDC) the ignition process starts and the piston is forced downwards during the power stroke, 1040 in FIG. 10B. Maximum brake torque (MBT) may be reached before the piston reaches BDC, e.g., at approximately 30 degrees after TDC (ATDC). After MBT the purge valve and exhaust valves open (e.g., at about 60 degrees ATDC). Thus the pressure in the combustion chamber is reduced (e.g., to about 500 psi) at a selected instant after TDC, e.g., about 60 degrees ATDC.

This is where the purge valve assembly 1106 improves performance and economy. During the power stroke the pressure in the combustion chamber (e.g., 500 psi) holds the exhaust valves 1104a, 1104b closed. While the exhaust valves 1104a, 1104b are still held closed, the purge valve 1106 opens away from its seated position (i.e., in a direction away from the combustion chamber). For example, the purge valve may open at about 90 degrees ATDC. To facilitate such operation, the purge valve assembly, and optionally the exhaust valve(s) and intake valve(s), may be implemented with electric solenoids (e.g., 1114 for the purge valve in FIG. 11B) to control opening and closing. Immediately after the purge valve assembly is opened, the pressure in the combustion chamber is expelled which allows the exhaust valves to open at approximately 90 degrees ATDC. As the piston travels toward BDC the air in the sub-chamber is compressed, and the pressure differential between the sub-chamber and the combustion chamber causes the transfer valve to open. The air in the sub-chamber is forced through the transfer valve into the combustion chamber where it mixes with hot exhaust gasses while the piston reaches BDC.

In the exhaust stroke the piston travels toward TDC and the transfer valve closes. The exhaust gases mixed with the air are then forced out of the combustion chamber through the open exhaust valves and purge valve. These may be burned substantially completely in a catalytic converter on the exhaust stroke. Also, as the piston travels towards TDC the base valve assembly opens and air-fuel mixture enters the sub-chamber through the inlets 130, providing intake stage 4 (e.g., 1050 in FIG. 10B). The exhaust valves and purge valves close when the piston reaches a point after TDC, e.g., at about 20 degrees ATDC. This also enhances the effectiveness and lowers the energy cost of the engine cooling provided by the cooler air that enters the sub-chamber, as described above.

In one embodiment the first approx. 110 degrees of crank rotation, (e.g., about 20 degrees BTDC) of the intake stroke not utilizing the intake valve 1102 located in the cylinder head may be unused for in economy or non-high performance engine applications.

Another example of how the purge valve assembly may be used to improve performance and economy relates to use of the purge valve assembly to provide a variable compression ratio, as described below.

For the purpose of this description, the sequence of operation starts on the exhaust stroke. An engine control unit (ECU) may be used with one or more sensors to sense when more fuel is needed to attain a stoichiometric air-fuel mixture. The one or more sensors may be, e.g., one or more of intake, exhaust, RPM, load, knock, throttle position, etc., sensors. When the piston is at about 20 degrees BTDC the intake valve in the cylinder head is opened. For example, the intake valve may be implemented with an electric solenoid coupled to the ECU, wherein the ECU determines, at a given instant, a proper state of the intake valve based on readings from the one or more sensors, and the ECU generates an intake valve control signal. In this way the ECU may control opening and duration the intake valve is opened. This may be referred to as a Variable Compression Mode (VCM) of operation, in which one or more engine operating parameters are continuously monitored by the one or more sensors and the intake valve is controlled accordingly.

Using VCM operation, engine performance may be improved substantially. For example, depending on the extent to which VCM is implemented, a variable amount up to about 60% more air and fuel may be allowed to enter the combustion chamber. In one embodiment the intake valve may be about closed at about 90 degrees after the piston reaches TDC (ATDC). The piston then travels to BDC, transferring, for example, about 82% minimum base sweep volume of air-fuel mixture from the sub-chamber to the combustion chamber via the transfer valve. This 82% combines with the variable amount up to about 60% already present in the combustion chamber. As a result, there may be a maximum air-fuel mixture up to about 142% of the sweep volume, which raises the compression ratio from about 8:1 up to a maximum of about 12.8:1. The raised compression ratio provided by VCM effectively replaces performance-enhancing devices such as turbo-chargers and super-chargers which are complex and expensive, and may require more maintenance.

EQUIVALENTS

Although specific embodiments are described herein, it will be appreciated that modifications may be made to the embodiments without departing from the scope of the invention. Accordingly, the invention should not be limited by the specific embodiments set forth, but should be given the broadest interpretation consistent with the teachings of the description as a whole.

The invention claimed is:

1. An internal combustion engine, comprising:
a hollow cylinder;
a cylinder head;
at least one exhaust valve disposed in the cylinder head for discharge of exhaust gases;
at least one fuel injector;
a piston within the hollow cylinder, the piston having at least one intake port that provides a passage for fluid flow through the piston;
a transfer valve disposed within a transfer valve housing of the piston, the transfer valve being configured to render the at least one intake port of the piston in an opened or closed state;
a base valve assembly disposed at a base of the cylinder that opens and closes to permit or restrict fluid flow into a sub-chamber below the piston;
wherein the internal combustion engine operates according to a four-stroke piston cycle including multiple fluid intake stages;
wherein during at least a first fluid intake stage the at least one intake port of the piston is in the opened state and an air-fuel mixture flows from the sub-chamber below the piston to a combustion chamber above the piston.

2. The internal combustion engine of claim 1, wherein during at least a second fluid intake stage the at least one intake port of the piston is in the closed state and the base valve assembly opens and permits an air-fuel mixture to flow from an intake manifold into the sub-chamber below the piston.

3. The internal combustion engine of claim 1, wherein during at least a third fluid intake stage the at least one intake port of the piston is in the closed state and the base valve assembly opens and permits air to flow from an intake manifold into the sub-chamber below the piston.

4. The internal combustion engine of claim 2, wherein the second fluid intake stage is during an exhaust stroke of the four-stroke piston cycle.

5. The internal combustion engine of claim 3, wherein the third fluid intake stage is during a compression stroke of the four-stroke piston cycle.

6. The internal combustion engine of claim 1, comprising a plurality of intake ports disposed in the piston;
wherein when the transfer valve is configured to render the plurality of intake ports of the piston in opened or closed states.

7. The internal combustion engine of claim 1, wherein the transfer valve opens when a fluid pressure in the sub-chamber is greater than a fluid pressure in the combustion chamber.

8. The internal combustion engine of claim 1, wherein the base valve assembly opens during a piston stroke when the piston is moving toward top dead center.

9. The internal combustion engine of claim 1, further comprising an intake port disposed within the cylinder head;
wherein an intake valve is configured to render the intake port in the cylinder head in an opened and closed state;
wherein the opened state permits fluid flow into the combustion chamber.

10. The internal combustion engine of claim 1, wherein the piston includes at least one piston ring;
wherein the piston and the at least one piston ring are cooled by the fluid flowing through the at least one intake port in the piston from the sub-chamber to the combustion chamber.

11. The internal combustion engine of claim 10, wherein the at least one piston ring comprises a non-metal material.

12. The internal combustion engine of claim 1, further comprising a purge valve disposed within the cylinder head;
wherein the purge valve is configured to open and close substantially at the same time that the at least one exhaust valve opens and closes.

13. The internal combustion engine of claim 1, wherein the internal combustion engine further comprises a connecting rod having one end attached to the piston and another end connected to a crank shaft assembly;

wherein the crank shaft assembly includes a hypocycloidal drive.

14. The internal combustion engine of claim 13, wherein the hypocycloidal drive comprises a connecting rod journal, a main journal, an internal gear, and an external drive gear.

15. The internal combustion engine of claim 14, wherein the external gear is engaged at a pitch circle diameter of the internal gear.

16. A method for implementing an internal combustion engine, comprising providing:
- a hollow cylinder and a base valve assembly disposed at a base of the cylinder;
- a cylinder head;
- at least one exhaust valve disposed in the cylinder head for discharge of exhaust gases;
- at least one fuel injector;
- a piston within the hollow cylinder, the piston having a transfer valve and at least one intake port that provides a passage for fluid flow through the piston;
- using the transfer valve to open and close the at least one intake port of the piston;
- using the base valve assembly to permit or restrict fluid flow into a sub-chamber below the piston; and
- operating the internal combustion engine according to a four-stroke piston cycle including multiple fluid intake stages;
- wherein at least a first fluid intake stage comprises using the transfer valve to open the at least one intake port of the piston to allow an air-fuel mixture to flow from the sub-chamber below the piston to a combustion chamber above the piston.

17. The method of claim 16, wherein at least a second fluid intake stage comprises using the transfer valve to close the at least one intake port of the piston and using the base valve assembly to open and permit an air-fuel mixture to flow from an intake manifold into the sub-chamber below the piston.

18. The method of claim 16, wherein at least a third fluid intake stage comprises using the transfer valve to close the at least one intake port of the piston and using the base valve assembly to open and permit air to flow from an intake manifold into the sub-chamber below the piston.

19. The method of claim 16, wherein the transfer valve opens when a fluid pressure in the sub-chamber is greater than a fluid pressure in the combustion chamber.

20. The method of claim 16, wherein the base valve assembly opens during a piston stroke when the piston is moving toward top dead center.

* * * * *